G. WITHINGTON.
Wheelbarrow Wheel.
No. 111,708. Patented Feb. 7, 1871.
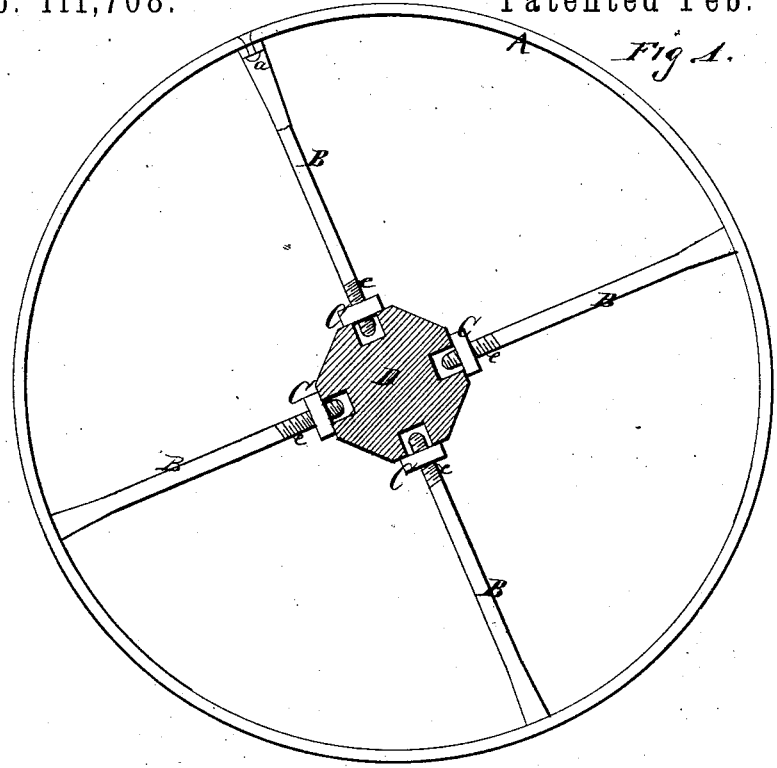
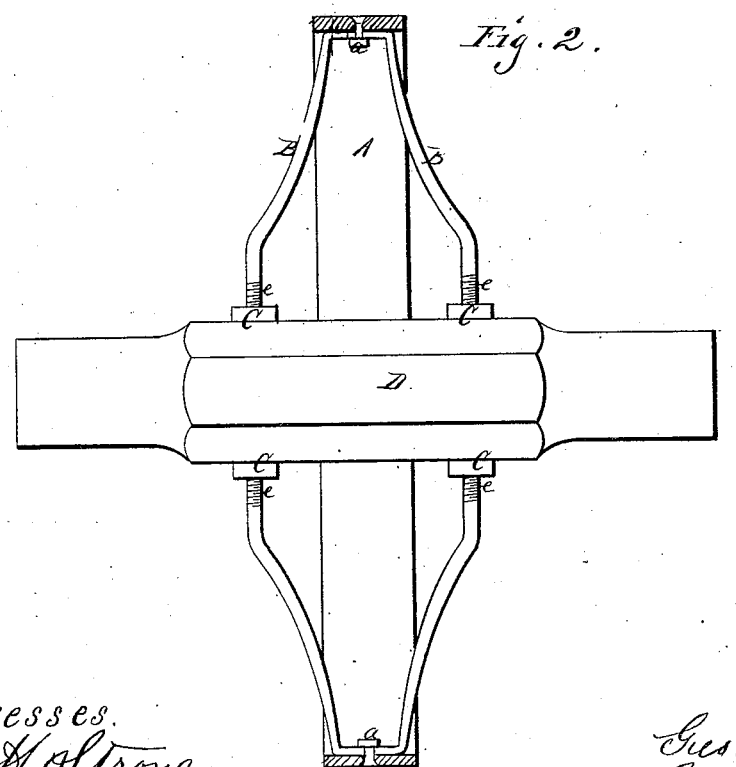
Witnesses.
Geo. H. Strong.
J. Fitzgerald
Inventor.
Geo. Withington,
By his atty
Dewey &c

United States Patent Office.

GEORGE WITHINGTON, OF IONE CITY, CALIFORNIA.

Letters Patent No. 111,708, dated February 7, 1871.

IMPROVEMENT IN WHEELS FOR WHEELBARROWS.

The Schedule referred to in these Letters Patent and making part of the same.

*To all whom it may concern:*

Be it known that I, GEORGE WITHINGTON, of Ione City, county of Amador, State of California, have invented an Improved Wheelbarrow-Wheel; and I do hereby declare the following description and accompanying drawing are sufficient to enable any person skilled in the art or science to which it most nearly appertains to make and use my said invention or improvements without further invention or experiment.

My invention relates to an improved construction of wheels, and is more particularly applicable to wheelbarrow, band, and truck-wheels, and the wheels of toy wagons.

Its construction is quite simple, and, consequently, cheap, while its peculiar construction will render it strong and durable.

In order to explain my invention so that others will be able to understand its construction, reference is had to the accompanying drawing forming a part of this specification, in which—

A represents an iron or other metallic tire.

The spokes which I employ consist each of a metal bar or rod, B, which is bent as shown, so that each half will serve as a bracing-spoke.

The bend of the rod is flattened so as to fit against the inner face of the tire, and a rivet, screw, or other fastening device, $a$, is employed to secure it in place against the tire.

The end of these spokes or rods B which is next to the hub or axle is provided with screw-threads, $e$, upon which a nut, C, is screwed, and the end of the rod or spoke enters a hole in the hub or axle D directly under the nut.

By screwing the nut C up or down on the rod the spokes can be tightened or loosened, as desired, the nut bearing against the hub so as to adjust the tire both centrally and laterally, and make the wheel run true on its axle or journals.

By this means I construct a strong and substantial wheel, which can be made very cheaply.

Having thus described my invention,

What I claim as my invention and improvement in the above-described wheel is—

The screws $e$ on the ends of the spokes B, provided with adjusting-nuts C, to true the tire of the wheel both centrally and laterally, substantially as described.

In witness whereof I have hereunto set my hand and seal.

GEORGE WITHINGTON. [L. S.]

Witnesses:
JNO. L. BOONE,
GEO. H. STRONG.